March 7, 1944.    S. N. HURT    2,343,615
WEIGHING SCALE
Filed Nov. 14, 1941
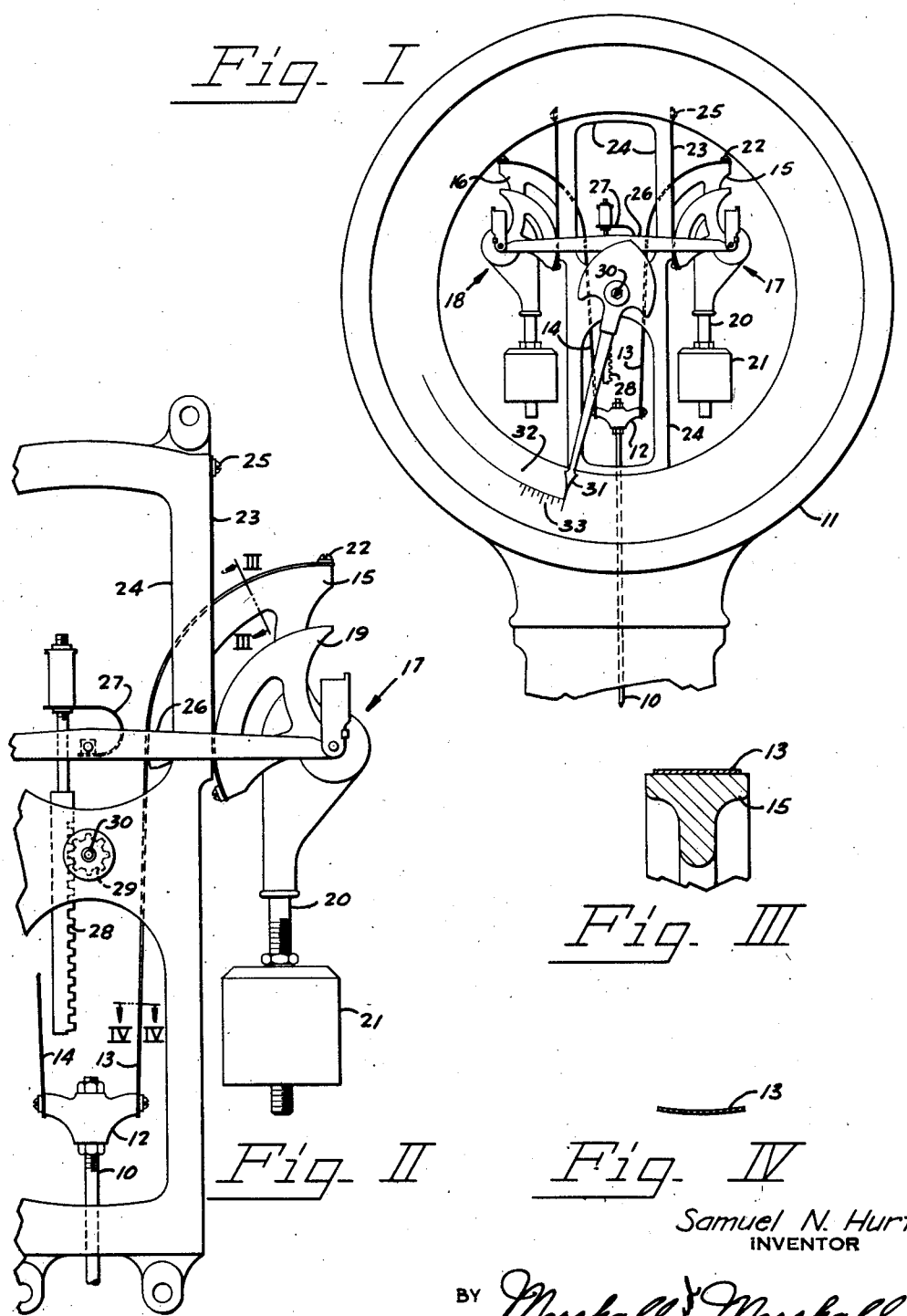
Samuel N. Hurt
INVENTOR
BY Marshall & Marshall
ATTORNEYS Patented Mar. 7, 1944

2,343,615

UNITED STATES PATENT OFFICE 2,343,615

WEIGHING SCALE

Samuel N. Hurt, Toledo, Ohio, assignor to Toledo Scale Company, Toledo, Ohio, a corporation of New Jersey Application November 14, 1941, Serial No. 419,148

3 Claims. (Cl. 265—62)

This invention relates to weighing scales, and more particularly to connection and suspension means adapted for use with arcuate cams and sectors in load counterbalancing mechanism.

Many automatic weighing scales employ pendulum type automatic load counterbalancing mechanisms. The pendulums in such mechanisms are usually constructed in the form of first class levers with the pendulum weights on the resistance arms and arcuate sector-like cams forming the power arms. The sector shape is used so that the point of application of force from the force transmitting portion of the scale to the pendulum may be kept at relatively the same place regardless of how far the pendulum is swung in response to the force being applied. This desirable feature is made possible by the use of flexible ribbon-like connecting means between the force transmitting mechanism and the sector-like portion of the pendulum. This connecting means must be flexible since it overlies the arcuate face of the sector and is "peeled" away from such face as the pendulum is displaced in response to the load applied to it by the force transmitting mechanism.

Such ribbons usually are thin, flat metallic strips which not only have a tendency to kink easily while being handled in installation or in repair work but may adopt the curved shape of the sector face unless made of extremely expensive materials. A further difficulty with such flat metallic ribbons is the fact that particles of dust, which may gather on the face of the sector, are held in place by the ribbon and change the effective radius of the sector. Still another difficulty is the fact that the relatively sharp edges of such a ribbon have a tendency to bite into the face of the sector, thus creating friction.

Further difficulties are encountered in the manufacture of such ribbons since, in order to prevent the above mentioned kinking and semipermanent deformation, the ribbons must be made of very expensive material, such as highly tempered steel.

It is an object of this invention to provide a flexible metallic ribbon for connecting force transmission mechanism to automatic load counterbalancing mechanism of the pendulum type which will resist kinking and bending to a sufficient degree to prevent it from permanently becoming misshapen.

It is another object of this invention to provide a flexible metallic ribbon for use with automatic load counterbalancing mechanism of the pendulum type having sector-like cam surfaces, the edges of which ribbon will not cut into the sector-like surfaces.

It is a further object of this invention to provide a flexible metallic ribbon for connecting force transmission mechanism of a weighing scale to the sector-like portions of automatic load counterbalancing pendulums which can be constructed of relatively low tempered material and which, because of its shape, will resist kinking, bending or twisting.

It is still another object of this invention to provide a flexible metallic ribbon adapted to overlie a curved surface which will resist a tendency to assume the shape of such surface and which will "peel off" of and wind thereon without scraping such surface.

More specific objects and advantages are apparent from the description, in which reference is had to the accompanying drawing illustrating a preferred form of scale embodying the invention.

In the drawing:

Fig. I is a view in elevation of the automatic load counterbalancing mechanism of a weighing scale employing ribbons embodying the invention.

Fig. II is a fragmentary view in elevation on an enlarged scale of a portion of the mechanism shown in Fig. I.

Fig. III is an enlarged sectional view, taken substantially on the line III—III of Fig. II.

Fig. IV is an enlarged sectional view, taken substantially from the position indicated by the line IV—IV of Fig. II.

The specific drawing and the specific description that follows merely disclose and illustrate the invention and are not intended to impose limitations upon the claims.

A vertical pull rod 10, which is attached at its lower end to a weighing scale lever system (not shown), extends upwardly into the interior of a dial housing 11 of a weighing scale. The upper end of the pull rod 10 is securely attached to an equalizer 12 to which there are fastened two flexible metallic ribbons 13 and 14. The ribbons 13 and 14 extend upwardly and overlie the arcuate faces of sector cams 15 and 16 which are an integral portion of load counterbalancing pendulums 17 and 18 respectively. The pendulum 17, for example, consists of the sector 15, fulcrum sectors 19, a stem 20 and a weight 21 adjustably mounted on the stem 20. The ribbon 13 is securely fastened at the upper end of the face of the sector 15 by means of a screw 22.

A similar metallic ribbon 23 is secured to the lower end of the face of each of the sectors 19, extends upwardly along the edge of a sector guide subframe 24 which is mounted within the housing 11, and is fastened to the upper portion of the subframe 24 by a screw clamp 25.

An equalizing bar 26 is pivotally connected to the pendulums 17 and 18 and has a resilient U shaped member 27 mounted at its center point. A vertically extending rack 28 is fastened to the member 27 and is in mesh with a pinion 29 which is secured on a shaft 30 rotatably mounted in the subframe 24. Also mounted on the shaft 30 is an indicator 31 which is adapted to swing over a circular chart 32 and to cooperate with a series of indicia 33 thereon to indicate the value of loads weighed on the scale.

The ribbons 13, 14 and 23 (see Fig. IV) have a concave-convex cross section which tends to prevent them from being kinked while being handled. When the ribbons are curved over the faces of the sectors 15, 16 and 19, the convex surface is placed against the face of the sectors and although (see Fig. III) the load suspended by the ribbons is sufficient to bend them and thus cause them to become straight across and thus lie flatly against the face of the sectors, their tendency to reassume their convex cross section, immediately at the point where they "peel off" the face of the sectors, prevents them from cutting or digging into the surfaces of the faces of the sectors. In addition, such convex form causes the edges of the ribbon to be slightly stretched when the ribbon is bent over the curved surfaces of the sectors and thus causes the ribbon to resist becoming so misshapen as to prevent it from conforming to the curved shape of the sectors.

The embodiment of the invention that has been disclosed may be modified to meet various requirements.

Having described the invention, I claim:

1. In a weighing scale, in combination, an arcuate sector forming a part of a load counterbalancing pendulum, and a ribbon connecting said sector to another portion of said scale, said ribbon having a curved cross section.

2. In a weighing scale, in combination, a load counterbalancing pendulum, an arcuate sector-like portion of said pendulum, and a ribbon of curved cross section overlying and clamped to said sector, its convex surface being adjacent the surface of said sector.

3. In a weighing scale, in combination, force transmitting means including an arcuate sector and a metallic ribbon overlying said sector and adapted to be wound upon and peeled from said sector under the influences of variations in forces transmitted by said means, said ribbon being normally curved in cross section and adapted to straighten in cross section where wound upon said sector and to spring into curved cross section where peeled away from said sector.

SAMUEL N. HURT.